Oct. 15, 1929.  J. LEDWINKA  1,731,629

AUTOMOBILE BODY WINDOW CONSTRUCTION

Filed Nov. 20, 1926

INVENTOR.
JOSEPH LEDWINKA
BY
ATTORNEY.

Patented Oct. 15, 1929

1,731,629

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY WINDOW CONSTRUCTION

Appplication filed November 20, 1926. Serial No. 149,702.

This invention relates to a window construction, and more particularly to a rear window construction for a closed automobile body, although it could be used for side or door windows equally as well.

In the manufacture of automobile bodies, it is aimed to so construct the parts that they may be readily formed and easily assembled. It is also advantageous to provide for the installation of those elements, such as window panes, upholstery and similar parts, so that the different elements may be readily disconnected for repair or replacement with a minimum disturbance of the others.

Accordingly, the present invention is directed toward accomplishing these aims, and its primary object is to provide a window construction wherein the elements thereof are readily formed and assembled, and wherein the window pane is retained in position in such a way that it may be easily removed without materially affecting the other elements of the body construction.

The description will, from time to time, as it progresses indicate and make clear other objects of the invention and the additional advantages flowing therefrom.

Concrete embodiments which the invention may take are illustrated in the accompanying drawing and in the following description, with the understanding, of course, that such embodiments are purely illustrative and that the invention is not to be taken as limited thereto.

The illustration of the drawing in its various views are:—

Figure 1:
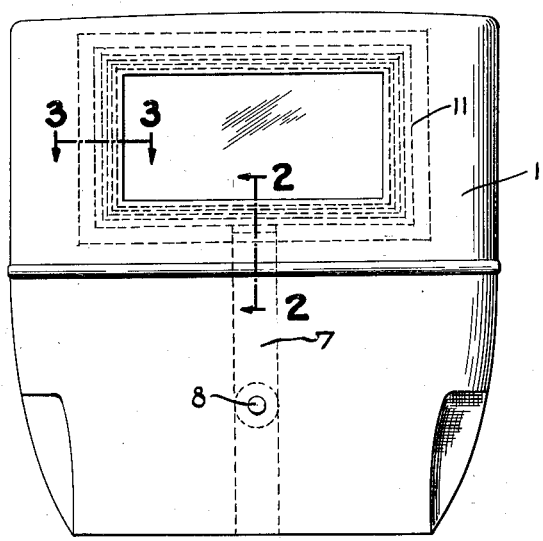
Fig. 1 shows in rear elevation a closed automobile body, the window retainer plate and other details being indicated in dotted lines.

The window construction forming the subject matter of this invention is part of an all metal closed automobile body, a rear elevation of which is disclosed in Figure 1.

The tonneau of the body may be formed in one or more sections, as desired, but since this formation does not constitute any part of the invention it is immaterial in this description. However, that portion of the tonneau paneling which does directly contribute to the formation of the rear window has been designated in the drawing by the numeral 1. The paneling 1 is provided with a central opening of rectangular or other desirable configuration, and is stamped inwardly around the periphery of the opening, thus providing an internal flange 2.

A beading or outer window retainer plate is arranged within the opening. This outer retainer plate is preferably an integral member of the same shape as the window opening and of angle section. An arm 3 of the angle plate is welded or otherwise secured to the flange 2, while an arm 4 thereof forms an outer stop for the window pane.

An upholstery supporting panel 5 of the usual form found in these bodies, has one of its ends 6 flanged outwardly. This end lies beneath the flange 2 and is preferably welded thereto. A member 7, having one end welded to the under side of flange 6 beneath the window opening and the other end extending downwardly to the sill (not shown) acts as a support or brace for the flange 2 and also as an anchor base for the spare tire carrier 8. This construction is clearly shown in dotted lines in Fig. 1.

The window pane 9, may have the usual felt or other packing channel 10 around its edges, and is placed in the window opening so that it bears against the outer window retainer plate.

In order to securely fasten in place the window pane 9, which being the rear window it is needless to say is stationary, and yet permit of its ready installation and removal, an inner retainer 11 is provided for the window. This retainer comprises a frame having outer and inner peripheries corresponding in shape to the periphery of the window opening. The inner periphery extends inwardly of the window opening so as to overlie the window pane, while the outer periphery extends outwardly of the opening a substantial distance. The outer part 12 of the retainer is adjacent to the upholstery supporting panel, being secured thereto by screws 15 or suitable means extending into tapped openings therein. The inner part 13 of the retainer is offset from the outer part and lies adjacent to the inner arm of the felt channel 10, being either co-extensive therewith or extending slightly therebeyond. A part 14 of the retainer sloping angularly toward the window connects the inner and outer parts 13 and 12. The retainer plate may be covered with cloth or be given any other suitable finish.

Figure 4:
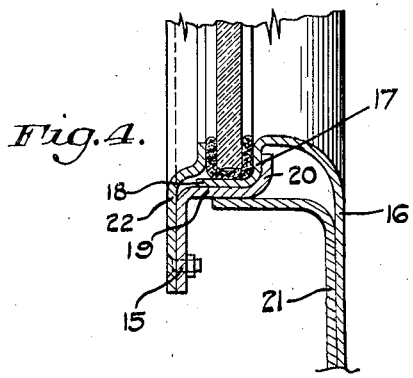
Figure 4 shows a vertical section through a modified form, the view being taken similarly to Fig. 2.
Figure 5:
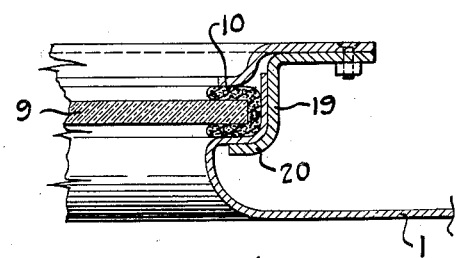
Figure 5 shows a horizontal sectional view of the modified form.

In the modification shown in Figures 4 and 5 the inner retainer plate is substantially the same as that above described. The main difference to be found in this form exists in the formation of the tonneau paneling 16 and the outer retaining means for the window pane.

The panel 16 is flanged inwardly, then downwardly and finally inwardly, as clearly shown, thereby presenting a shoulder 17 surrounding the window opening and forming the outer window retaining means. The inner end of the panel 16 constitutes a supporting flange 18 for the window. The upholstery supporting panel 19 is substantially the same as the corresponding element in the other form, except that its end is formed with an upwardly extending flange 20 secured to the shoulder 17 upon the outer side thereof. A window bracing and spare tire carrier anchoring base 21 similar in every respect to the member 7 is also provided in this modified form.

In all essential details the inner retainer plate 22, as previously mentioned, is similar to the one in the other form, and a detail description thereof is thought to be unnecessary.

The simplicity of the window construction herein described is now apparent. The window may be readily removed in case of breakage, or for any other reason, by merely removing the inner retainer plate and such removal in no way affecting the upholstery or other elements of the body. On the other hand, once the window is in place, the retainer plate holds the same securely against rattle or other objectionable features.

Figure 2:
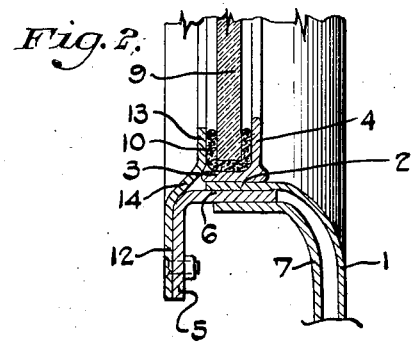
Fig. 2 shows a fragmentary vertical sectional view through the rear window taken on line 2—2 of Fig. 1, and illustrates one form of the invention.
Figure 3:
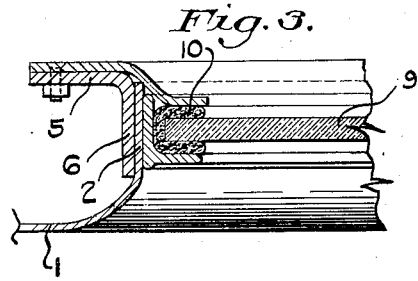
Figure 3 shows a fragmentary horizontal sectional view taken on line 3—3 of Figure 1.

The construction of the window other than the arrangement of the inner retainer plate also commends itself for its simplicity. This is true of both forms disclosed in the drawing. The form shown in Figs. 2 and 3, is such, that the tonneau panel 1 may be formed into the rear window opening by the most simple of die stamping operations, while the other form depicted illustrates how the tonneau panel itself may be so stamped as to form the outer retaining means for the window.

The invention may be embodied in various modified forms, and it is understood that it is only limited by the scope of the appended claims, and also that it is applicable to other forms of windows than the rear window described.

What I claim is:—

1. A rear window construction for a closed automobile body comprising a tonneau panel inwardly flanged to form a window opening, said flange cooperating with an outer window retaining means to form a window support, and an inner window retaining means formed of a unitary sheet metal stamping surrounding the window opening and having a portion parallel with the outer retaining means to form a window channel and another portion surrounding the window opening indirectly and detachably connected to the tonneau panel, which said portions lie in different planes.

2. A rear window construction for a closed automobile body comprising a tonneau portion inwardly flanged to form a window opening, said flange cooperating with an outer window retaining means to form a window support, an upholstery supporting panel secured to the under side of said flange, a window support and spare tire carrier anchoring base secured to the under side of the upholstery support below the window opening, and an inner window retaining means formed of a single plate having a portion parallel with the outer retaining means to form a window channel and another portion surrounding the window opening detachably connected to said upholstery supporting panel.

3. A tonneau window construction comprising a sheet metal tonneau panel having a window opening flanged inwardly of the panel then laterally of the window opening, and then again inwardly of the tonneau panel, and provided with a perimetral extension extended laterally of the window opening and spaced from the tonneau panel, and an inner retaining wall emanating from the said extension and having an offset projecting inwardly of the window opening to constitute with the laterally extending branch of the flange, a channel for a window glass.

4. A tonneau window frame comprising a tonneau panel, an inwardly projecting flange at right angles to the body of the tonneau panel, a laterally extending flange at right angles to the inwardly extending flange, an outer retaining wall rising inwardly of the body of the panel and an inner retaining wall rising from the laterally extending flange and extending inwardly of the window opening to constitute with the outer wall a glass receiving channel.

In testimony whereof he hereunto affixes his signature.

JOSEPH LEDWINKA.